United States Patent
Delolme et al.

(10) Patent No.: US 8,290,870 B2
(45) Date of Patent: Oct. 16, 2012

(54) METHOD AND DEVICE FOR EXCHANGING VALUES BETWEEN PERSONAL PORTABLE ELECTRONIC ENTITIES

(75) Inventors: Pierrick Delolme, Paris (FR); Marc Bertin, La Celle les Bordes (FR)

(73) Assignee: Oberthur Technologies, Levallois-Perret (FR)

( * ) Notice: Subject to any disclaimer, the term of this patent is extended or adjusted under 35 U.S.C. 154(b) by 0 days.

(21) Appl. No.: 12/255,860

(22) Filed: Oct. 22, 2008

(65) Prior Publication Data

US 2009/0119214 A1    May 7, 2009

(30) Foreign Application Priority Data

Oct. 22, 2007 (FR) ..................... 07 58477

(51) Int. Cl.
*G06Q 40/00*    (2006.01)
(52) U.S. Cl. .................. 705/44; 705/35; 705/39
(58) Field of Classification Search .......... 705/35, 705/39
See application file for complete search history.

(56) References Cited

U.S. PATENT DOCUMENTS

| | | | |
|---|---|---|---|
| 7,603,316 B1* | 10/2009 | Fife et al. ................. | 705/44 |
| 2005/0187873 A1* | 8/2005 | Labrou et al. ............. | 705/40 |
| 2007/0001001 A1* | 1/2007 | Myers et al. .............. | 235/380 |
| 2007/0123215 A1 | 5/2007 | Wang | |
| 2007/0254712 A1* | 11/2007 | Chitti ....................... | 455/558 |
| 2008/0177668 A1* | 7/2008 | Delean ...................... | 705/76 |
| 2008/0270300 A1* | 10/2008 | Jones et al. ................ | 705/41 |
| 2008/0313047 A1* | 12/2008 | Casares et al. ............ | 705/17 |
| 2009/0070263 A1* | 3/2009 | Davis et al. ............... | 705/44 |

FOREIGN PATENT DOCUMENTS

| | | |
|---|---|---|
| DE | 10 2004 046847 | 4/2006 |
| WO | 2005079038 | 8/2005 |
| WO | 2007/076456 | 7/2007 |
| WO | 2007/119032 | 10/2007 |

OTHER PUBLICATIONS

International Search Report dated May 2, 2008, in French application.

* cited by examiner

*Primary Examiner* — William Rankins (74) *Attorney, Agent, or Firm* — Young & Thompson (57) ABSTRACT

A method and a portable electronic device enables a debitor to transfer a monetary or other amount to a creditor, in particular via a near-field wireless communication module. After receiving information for authenticating the debitor via the communication module and after receiving data linked to the monetary or other amount, a transaction request including the data is created and sent. The transaction request is advantageously sent via a mobile telephone network or via a data communication network.

20 Claims, 3 Drawing Sheets

METHOD AND DEVICE FOR EXCHANGING VALUES BETWEEN PERSONAL PORTABLE ELECTRONIC ENTITIES

TECHNICAL FIELD OF THE INVENTION

The present invention concerns the exchange of amounts in values, for example monetary values, loyalty points, purchase or subscription vouchers, and more particularly a method and a device for exchanging monetary and other amounts between portable electronic entities, for example between mobile telephones.

PRIOR ART

The evolution of communication networks, notably the Internet, has contributed to the development of new modes of distribution of goods and services which have themselves driven the use of new means of payment. For example, payment via a communication network, also known as online payment, enables a user, after ordering goods or services, to provide banking information, an amount and an authorization to a trusted third party in order for the latter to send a transaction request to the computer system of the banking establishment concerned.

However, although means of payment between different companies or between persons and companies have led to numerous developments, few systems enable simple and secure exchange of amounts in values between a number of persons.

There exist electronic purses enabling a debitor to pay a monetary sum to a creditor, the debitor and the creditor being physically close to each other at the time of the transaction. In these systems, a payment card is able to store a number representing a monetary amount. The card can be credited, or topped up, using an appropriate device. It is debited on each payment. This payment method does not generally employ an authentication mechanism for verifying the consent of the cardholder, being in many cases an anonymous method of payment, such as payment in cash. However, such payment means can be used only for small transactions. Moreover, to receive the money, the creditor must have a device adapted to read the card, by contact or without contact.

There are also systems, such as the system described in patent application WO 03/023574, enabling a debitor to pay a monetary sum to a creditor, the debitor and the creditor not necessarily being close to each other at the time of the transaction. In these systems, a monetary transfer can be effected between two persons who have electronic entities such as mobile telephones. Here the transactions are effected through a central system in which profiles of the users are stored. Such profiles store users' banking information and carry out the necessary checks. However, such solutions entail entering the identity of the creditor, which can be tiresome.

The invention solves one or more of the above problems.

OBJECT OF THE INVENTION

Thus, it is an object of the invention to provide a personal portable electronic device enabling a creditor to transfer a monetary or other amount, including:
near-field wireless communication means;
means for receiving via said near-field wireless communication means from a personal portable electronic entity of a debitor a secure message including information for authenticating said debitor;
means for creating a transaction message including data linked to said monetary or other amount; and
means for sending said transaction message.

The device of the invention therefore provides a simple way to carry out a transaction securely using a personal portable electronic entity such as a mobile telephone, without having to use a dedicated device such as a payment terminal or a particular environment.

In one particular embodiment, said secure message further includes a reference to said debitor, said means for receiving a secure message being adapted to send said reference to said means for creating a transaction message that are adapted to add said reference to said transaction message. Thus the transaction message can include a reference to the debitor to enable a computer system of a third party to effect a debit operation corresponding to the transaction.

Still in one particular embodiment, said secure message further includes said data linked to said monetary or other amount, said means for receiving a secure message being adapted to send said data linked to said monetary or other amount to said means for creating a transaction message. The device of the invention therefore enables a debitor to enter or confirm the amount of the transaction on their personal portable electronic entity.

The device of the invention preferably further includes input means adapted, for example, to input said data linked to said monetary or other amount. Such input means can also be used to input information for authenticating said debitor, such as a personal identification number.

Said near-field wireless communication means are advantageously adapted to send said data for authenticating said debitor. Thus, if the debitor enters data for authenticating them on the personal portable electronic entity of the creditor, the debitor can nevertheless be authenticated in the personal portable electronic entity of the debitor to make the transaction secure.

In one particular embodiment, the device further includes storage means storing complementary information such as a reference of an account to be credited or a reference of said creditor, said means for creating a transaction message being adapted to add said complementary information to said transaction message. The transaction message can therefore include a reference enabling a computer system of a third party to effect a credit operation corresponding to the transaction.

The device advantageously further includes means for adding to said transaction message authentication information enabling a recipient of said transaction message to authenticate at least part of said transaction message. Such authentication information can therefore authenticate said data, said debitor and/or said creditor.

In one particular embodiment, said means for adding authentication information include cryptographic means for signing at least part of said transaction message.

The device advantageously further includes cryptographic means adapted to encrypt at least part of said transaction message to make the transaction secure.

In one particular embodiment, said means for sending said transaction message are adapted to defer sending of said transaction message. A transaction involving a computer system of a third party can therefore be initiated in the absence of a connection to that computer system.

The device preferably further includes means for receiving a transaction confirmation message. Thus, if the transaction involves a computer system of a third party, it is possible to verify that the transaction has been effected correctly. The device advantageously includes storage means for storing a received transaction confirmation message to maintain a record of transactions.

Still in one particular embodiment, said near-field wireless communication means are adapted to send said transaction confirmation message. It is therefore possible to send the transaction confirmation message to the personal portable electronic entity of the debitor.

In one particular embodiment, the device further includes means for storing a first number and means for subtracting or adding a second number from/to the first number, according to said data. Thus the transaction can be effected directly between personal portable electronic entities, without recourse to a computer system of a third party.

The device advantageously further includes means for setting up a secure communication channel between said near-field wireless communication means and equivalent means of another portable electronic device, to make the transaction secure.

Still in one particular embodiment, the device further includes mobile telephone means and/or data communication network access means for sending a transaction request to a computer system of a third party.

The device of the invention thus combines local exchange of information and exchange of information via a mobile telephone network or a data network, for example, to simplify a transaction and make it secure.

The device advantageously further includes means for indicating the status of said transaction. Thus the device of the invention in particular makes it possible to determine if the devices of the debitor and the creditor must be near each other.

Said near-field wireless communication means conform to the NFC standard, for example. They can be integrated into a microcircuit card.

Said monetary or other amount is, for example, a monetary value, a number of loyalty points, a purchase or subscription voucher, a number of gaming points, a number of telephone units or rights to reproduce digital recordings.

The invention further consists in a mobile telephone including the device described above.

The invention further consists in a method for sending a monetary or other amount between a debitor and a creditor each having a personal portable electronic entity including near-field wireless communication means, this method including the following steps:

receiving information for authenticating said debitor via said near-field wireless communication means;

receiving data linked to said monetary or other amount;

creating a transaction message including said data; and sending said transaction message.

The device of the invention therefore provides a simple way to carry out a transaction securely using a personal portable electronic entity such as a mobile telephone, without having to use a dedicated device such as a payment terminal or a particular environment.

In one particular embodiment, said data linked to said monetary or other amount is received via said near-field wireless communication means. The method of the invention therefore enables a debitor to enter or confirm the amount of the transaction on their personal portable electronic entity.

The method advantageously further includes a step of acquiring data for authenticating said debitor. Debitors can therefore use a personal identification number to authenticate themselves, for example. Other data such as a fingerprint can also be used.

In one particular embodiment, the method further includes a step of adding information relating to said debitor to said transaction message. The transaction message can therefore include a reference to the debitor to enable a computer system of a third party to effect a debit operation corresponding to the transaction.

Still in one particular embodiment, the method further includes a step of adding complementary information relating to said creditor to said transaction message. The transaction message can therefore include a reference to the creditor to enable a computer system of a third party to effect a credit operation corresponding to the transaction.

The method advantageously further includes a step for adding to said transaction message authentication information enabling a recipient of said transaction message to authenticate at least part of said transaction message. It is therefore possible to authenticate said data, said debitor and/or said creditor. Said step for adding authentication information can include a step for signing at least part of said transaction message, for example.

The method preferably further includes a step of encrypting at least part of said transaction message to make the transaction secure.

The method advantageously includes a step of setting up a secure communication channel between said near-field wireless communication means of said personal portable electronic entities in order to make the transaction secure.

The method is advantageously implemented in the personal portable electronic entity of said creditor.

The method advantageously further includes a step of moving said personal portable electronic entities closer to each other to make the transaction secure.

In one particular embodiment, said transaction message is sent via a mobile communication network or via a data communication network, for example via a connection set up between said personal portable electronic entity of said creditor and a computer system of a third party.

The method of the invention therefore combines local exchange of information and exchange of information via mobile telephone network or data network, for example, to simplify a transaction and make it secure.

In one particular embodiment, sending said transaction message is deferred. A transaction involving a computer system of a third party can therefore be initiated in the absence of a connection to that computer system.

The method advantageously further includes a step of receiving a transaction confirmation message. Thus, if the transaction involves a computer system of a third party, it is possible to verify that the transaction has been effected correctly. Moreover, the method preferably includes a step of storing said transaction confirmation message in order to maintain a record of transactions.

Still in one particular embodiment, the method further includes a step of forwarding said transaction confirmation message via said near-field wireless communication means. It is therefore possible to send the transaction confirmation message to the personal portable electronic entity of the debitor.

Still in one particular embodiment, the method further includes a step of adding or subtracting said data to, respectively from, a number stored beforehand. The transaction can thus be effected directly between personal portable electronic entities, without using a computer system of a third party.

The method advantageously further includes a step for indicating the status of said transaction. Thus the method of the invention makes it possible, in particular, to determine if the portable electronic entities of the debitor and the creditor must be close to each other.

Said monetary or other amount is, for example, a monetary value, a number of loyalty points, a purchase or subscription voucher, a number of gaming points, a number of telephone units or rights to reproduce digital recordings.

In one particular embodiment said personal portable electronic entity of said creditor is a mobile telephone. Similarly, in one particular embodiment, said personal portable electronic entity of said debitor is a mobile telephone or a microcircuit card. The method of the invention is therefore easy to use and does not necessitate a dedicated device such as a payment terminal or a particular environment.

The invention further consists in a computer program including instructions adapted to execute each of the steps of the method as described above.

BRIEF DESCRIPTION OF THE DRAWINGS

Other advantages, objects and features of the present invention emerge from the following detailed description, given by way of nonlimiting example, with reference to the appended drawings, in which:

FIG. 2, comprising FIGS. 2a and 2b, shows a first example of an algorithm for implementing the invention in order to transfer a monetary or other amount between a debitor and a creditor each having a portable electronic entity;

FIG. 5, comprising FIGS. 5a, 5b and 5c, shows a second embodiment of the invention in order to transfer a monetary or other amount between a debitor and a creditor each having a portable electronic entity.

DETAILED DESCRIPTION OF THE INVENTION

The invention allows a debitor to send a monetary or other amount to a creditor using a mobile telephone and an electronic entity such as a mobile telephone or a microcircuit card. Here these electronic devices have near-field wireless communication means, for example enabling communication at a maximum distance of one meter, fifty centimeters or twenty centimeters.

The mobile telephone also has communication means for transferring a transaction request to a computer system, typically a server, of a banking establishment, a trusted third party or a person responsible for managing the values concerned. Such communication means are telephone communication means, for example, in particular GSM (Global System For Mobile communications) or GPRS (General Packet Radio Service) telephone communication means. Alternatively, the communication means provide access to a data communication network to which the computer system of the banking establishment, the trusted third party or the person responsible for managing the values concerned is connected, to send the transaction request via the network. Such communication means are compatible with one or more of the WiFi standards, for example.

The amounts in values are monetary values, for example, loyalty points, purchase or subscription vouchers, gaming points, telephone units or rights to reproduce digital recordings (audio or audio and video).

Figure 1:
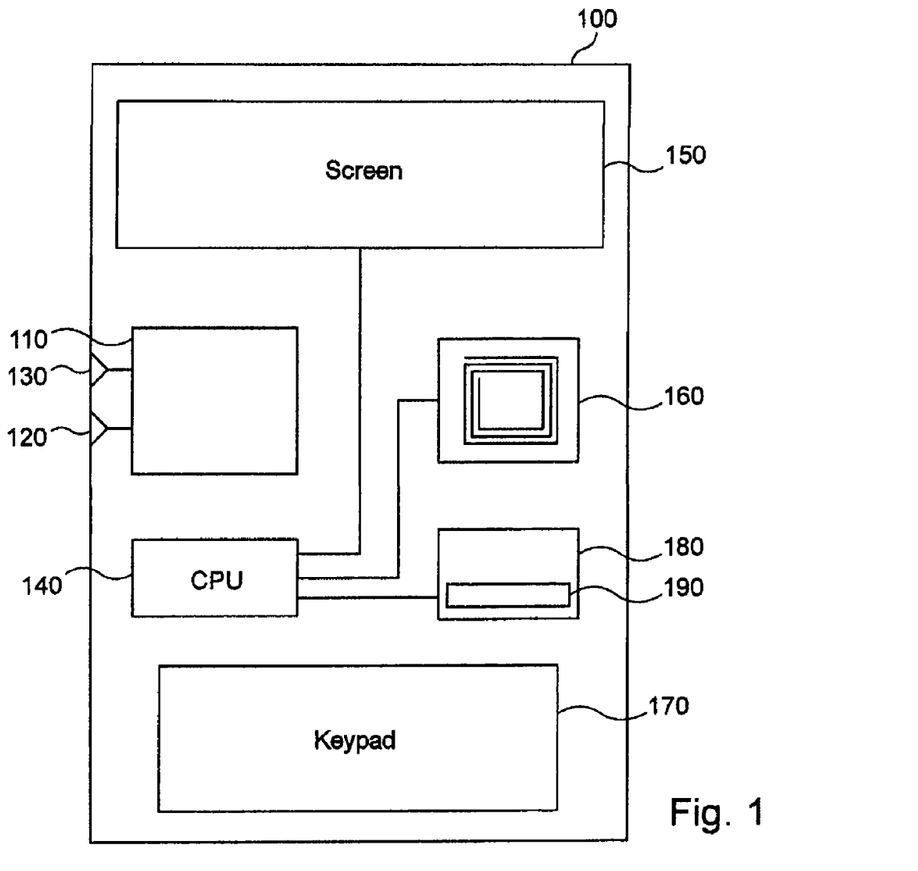
FIG. 1 is a diagram representing a portable electronic entity for implementing the invention.

FIG. 1 represents a mobile telephone 100 adapted to implement the invention. As shown, the mobile telephone 100 includes a mobile telephony module 110, advantageously connected to a loudspeaker 120 and to a microphone 130. The mobile telephone 100 also includes a Central Processing Unit (CPU) 140 and, preferably, a screen 150.

The mobile telephone 100 further includes a near-field communication module 160, advantageously a near-field wireless communication module. The module 160 is of the NFC (Near Field Communication) type, for example. The module 160 can be installed directly in the mobile telephone 100, for example in the form of an integrated circuit and antenna, or inserted in the mobile telephone 100, for example in the form of a microcircuit card including an integrated antenna.

The mobile telephone also includes an input device 170, such as a keypad or equivalent device, for entering characters, amounts in values and/or commands. In conjunction with the screen 150, the input device 170 forms a user interface. The input device 170 can equally be integrated in the screen 150 in the form of a touch-sensitive screen.

The mobile telephone 100 also includes a memory module 180 adapted to store an application 190 for exchanging amounts in values by means of the near-field wireless communication module 160 with another portable electronic entity that has a compatible communication module.

Figure 2:
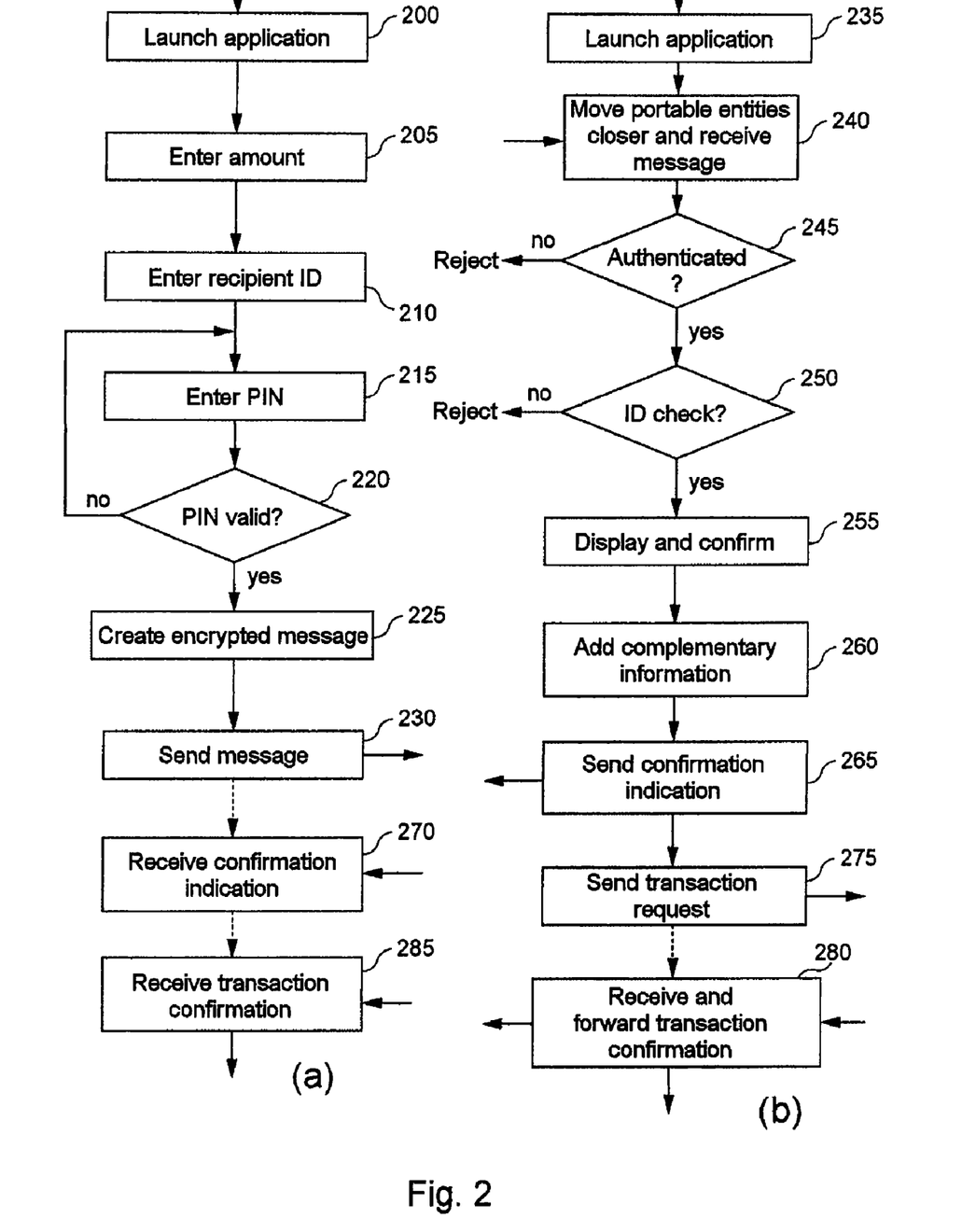

FIG. 2, comprising FIGS. 2a and 2b, shows a first example of an algorithm for implementing the invention to send a monetary or other amount between two persons, a debitor and a creditor, one having a mobile telephone, for example that shown in FIG. 1, and the other a portable electronic entity, which can also be a mobile telephone. It is considered here that the debitor and the creditor each have a mobile telephone like that shown in FIG. 1. The debitor and the creditor therefore have mobile telephones 100 and 100', respectively.

The debitor is the person to whom the monetary or other amount is debited, for example the holder of an account that is debited, and the creditor is the person who receives the monetary or other amount, for example the holder of an account that is credited.

FIG. 2a represents the algorithm used in the mobile telephone of the debitor and FIG. 2b represents the algorithm used in the mobile telephone of the creditor. These algorithms are preferably partially integrated into a secure module (for authentication and addition of information enabling authentication) and partially in the same application, for example the applications 190 and 190', that can be used for debit and credit operations (user interface).

First of all, the debitor must launch the application for transferring a monetary or other amount (step 200). This application is the application 190 shown in FIG. 1, for example. The user can then enter a monetary or other amount (step 205) using the input device 170. This amount can be displayed on the screen 150 before it is confirmed.

When the user has confirmed this amount, they can be prompted to enter an identifier of the creditor (step 210), in particular if a secure communication channel has not been set up between the portable electronic entities of the debitor and the creditor. The identifier of the creditor is preferably short, such as their initials. It can be represented on six bytes, for example. Once again, the identifier of the creditor can be displayed before it is confirmed. This identifier is spoken by the creditor, for example.

The user is then prompted to enter an indication enabling their authentication, such as a Personal Identification Number or PIN (step 215). This code is preferably not displayed or is advantageously at least partially masked so that it cannot be viewed by a malicious person.

When the personal identification number has been confirmed, by the user or automatically if it conforms to predetermined rules, a test is effected to authenticate the user (step 220). For this purpose, the personal identification number can be sent to an authentication module which can be installed in the near-field wireless communication module 160, for example. The authentication module compares the code entered by the user with a code stored beforehand. If the personal identification number entered by the user does not match the number stored beforehand, the user is prompted to enter the personal identification number again. The number of attempts to enter the personal identification can be limited, for example to three attempts. Alternatively, or in addition to this, a pause time can be introduced between each attempt and the next, the pause time increasing on each attempt.

If the personal identification number is correct, the authentication module sends the application 190 an acknowledgement enabling the transfer of a monetary or other amount. The application 190 preferably displays an authentication indication on the screen 150 to advise that the transaction can be effected.

Figure 3:
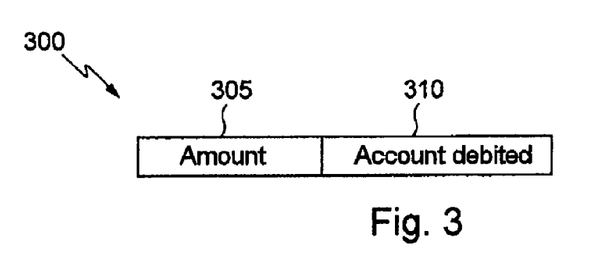
FIG. 3 shows an example of part of a message that can be sent by the portable electronic entity of the debitor to that of the creditor during the transaction, before it is encrypted.

A message is created (step 225). The message includes the monetary or other amount entered by the user. The message advantageously also includes indications relating to the identification of the debitor and/or of the account to be debited. FIG. 3 shows an example of the information contained in such messages, which can be created by the application 190.

It should be noted here that the message can also include an indication relating to the identity of the creditor, such as their initials. However, in one advantageous embodiment, the transaction is preceded by an exchange of preliminary information between the two mobile telephones via the near-field wireless communication interface in order to set up a secure communication channel. It is therefore not necessary here to insert an indication relating to the recipient into the message. This exchange of preliminary information is also used to send one or more temporary cryptographic keys used to encrypt and decrypt the data exchanged.

The communication link set up between the mobile telephones is preferably made secure by means of a security module including cryptographic means known to the person skilled in the art, typically means for encrypting, decrypting, signing and verifying a signature and means for storing one or more cryptographic keys.

As indicated hereinabove, a secure communication channel is preferably set up between the two mobile telephones. Communication via the near-field wireless communication interface being then made secure by the use of temporary keys, it is not always necessary specifically to encrypt the message using another key.

Alternatively, at least part of the message is preferably encrypted and/or signed. For example, the indication relating to the creditor can be encrypted and signed to enable the creditor to authenticate the message whereas the information relating to the amount and to the account number of the debitor can be encrypted and signed to enable the server responsible for effecting the transaction to authenticate the message to verify that it was submitted by the debitor. In this case, two different keys can be used.

A security module containing cryptographic means for encrypting, decrypting, signing and verifying a signature can be installed in the near-field wireless communication module 160, for example. The security module preferably includes a secure microcontroller certified under the common criteria or in conformance with the requirements of the FIPS (Federal Information Processing Standards). This module is used to encrypt and decrypt all data in transit on the secure communication channel or, more specifically, the message. The message is then sent to the near-field wireless communication module 160 where it is encrypted. The encryption means are based on standard algorithms, for example, such as the DES (Data Encryption Standard), AES (Advanced Encryption Standard) and RSA (Rivest, Shamir and Adleman) algorithms, and a stored key. The security module can equally be installed elsewhere, for example in an SIM (Subscriber Identity Module) card inserted into the portable electronic entity or in the application 190.

Naturally there are other systems for making the transaction secure and authenticating the author of the message.

The encrypted message is then sent to the creditor (step 230) by the near-field wireless communication module 160.

If the mobile telephones of the debitor and the creditor are not close to each other, they must be moved close to each other, for example to a distance less than 20 centimeters or 50 centimeters. The minimum relative distance between the mobile telephones is determined by the range of the near-field wireless communication means. This step of moving the mobile telephones closer contributes to the security of the system by limiting the risk of the information exchanged being intercepted and used by a third party.

Following agreement with the debitor, the creditor launches the application 190' for transferring a monetary or other amount (step 235). Alternatively, the application 190' can be launched automatically after reception of the message, if the received message has been identified as a transaction message.

When the mobile telephone 100' of the creditor receives the encrypted message sent by the debitor (step 240) using its near-field wireless communication module 160', an authentication step (step 245) is executed. The purpose of this authentication step, based for example on the use of a public key, is to check the source of the received message. Authentication is preferably effected by a security module installed in the module 160', for example.

If the message is not authenticated, it is rejected.

If the message is authenticated and is not received via a secure communication channel, a test is effected to determine if the user of the mobile telephone 100' is the recipient of the transfer (step 250), i.e. if the user of this mobile telephone is the creditor. To this end, the indications relating to the identity of the creditor contained in the received message are compared to the indications relating to the identity of the creditor stored beforehand in the mobile telephone 100', for example in the security module that can be installed in the near-field wireless communication module 160'. This test makes the transfer secure and reduces the already low risk (the communication range is limited) that the message will be intercepted by another mobile telephone.

If the user is not the recipient of the transfer, the message is rejected.

If the user is the recipient of the transfer, the received message is transferred to the application 190'. If part of the message is confidential, preferably only the non-confidential part is sent to the application 190', which is not necessarily secure. Some information contained in the message is then preferably displayed on the screen 150' to enable the creditor to validate the transaction (step 255). The information displayed is the amount, for example, and indications relating to the identity of the debitor.

Figure 4:
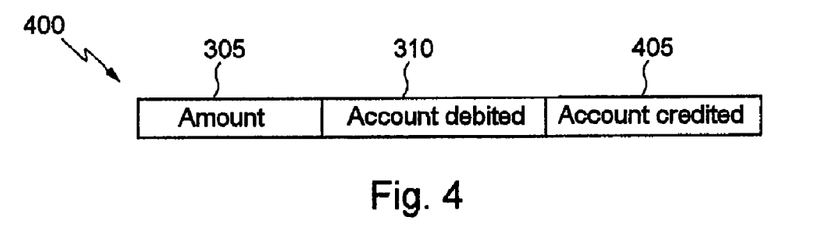
FIG. 4 shows an example of part of a message sent by the portable electronic entity of the creditor to that of the debitor when the creditor has confirmed the transaction or part of a message sent to a computer system of a banking establishment, a trusted third party or a person responsible for managing the values concerned, in transaction request form.

The user can use the input device 170' to confirm the transaction or not. If the user does not confirm the transaction, the message is rejected. On the other hand, if the user confirms the transaction, complementary information is added to the message received (step 260). As shown in FIG. 4, this complementary information consists of data relating to the identity of the creditor and to the account to be credited, for example. This complementary information, which is preferably encrypted in the message, can be added by the security module at the request of the application 190'. This request to add the complementary information is therefore preferably sent with a confirmation indication to the module 160' including, for example, the security module. The near-field wireless communication module 160' in turn sends (step 265) a confirmation indication to the near-field wireless communication module 160 of the mobile telephone of the debtor. The confirmation indication sent from the mobile telephone of the creditor to that of the debtor advantageously includes the complementary information added to the message.

The confirmation indication received by the near-field wireless communication module 160 of the mobile telephone of the debtor can be stored by that module or in the storage module 180 (step 270). The confirmation indication can be displayed on the screen 150.

A transaction request is then sent by the mobile telephone of the creditor to the computer system of the banking establishment, the trusted third party or the person responsible for managing the values concerned (step 275). Here this request is sent via the mobile telephone network.

The transaction request can include information for authenticating the request, in particular authentication information added by the modules 160 and/or 160' using cryptographic keys stored in these modules (these cryptographic keys are different from the temporary keys used to secure the call between the two portable electronic entities). The transaction request is therefore advantageously similar to the confirmation indication sent from the mobile telephone of the creditor to that of the debtor, possibly encrypted using a different key, enabling authentication by a trusted third party.

Alternatively, the transaction request can be sent by the mobile telephone of the debtor taking account of the complementary information received with the confirmation indication.

The transaction request can equally be sent via a data communication network such as the Internet.

If the transaction request is not rejected by the computer system of the banking establishment, the trusted third party or the person responsible for managing the values concerned, for example if there is not sufficient credit on the account, the transaction is effected, in the standard way, by the computer system of the banking establishment, the trusted third party or the person responsible for managing the values concerned. A transaction confirmation message is preferably sent to the mobile telephones of the debtor and the creditor when the transaction has been effected (steps 280 and 285) or preferably to the mobile telephone of the only sender of the transaction request. In this case, the mobile telephone of the sender of the transaction request advantageously sends the other mobile telephone the transaction confirmation or rejection message.

Transaction confirmations are stored in each mobile telephone, preferably in a nonvolatile memory, for archival storage purposes.

Alternatively, the transaction can be initiated by the creditor sending a message containing the references of the account to be credited to the debtor, the latter sending a message confirming the transaction to the debtor, possibly with complementary information concerning them.

It should be noted here that the near-field wireless communication module 160 can take the form of a microcircuit card. This module is an electronic purse, for example. Alternatively, the near-field wireless communication module 160 can be integrated into the central processing unit 140, then forming a single integrated circuit. It can equally consist of an integrated circuit, either comprising the antenna or not, mounted in the body of the portable electronic entity. The antenna can be integrated into the circuit or into another component of the portable electronic entity.

Moreover, the connection to the computer system of the banking establishment, the trusted third party or the person responsible for managing the values concerned and the communication of the transaction request can be effected during the transaction or later. This communication is preferably secure. In particular, the transaction request received by the computer system of the banking establishment, the trusted third party or the person responsible for managing the values concerned is advantageously authenticated.

If the values are stored and updated directly in the mobile telephones, it is not necessary to effect a connection to a computer system of the banking establishment, the trusted third party or the person responsible for managing the values concerned. For example, if the near-field wireless communication modules 160 and 160' are electronic purses and the applications 190 and 190' have functions for reducing and increasing the stored values, setting up a connection is not required. Similarly, if the values concerned are loyalty points, if they are stored directly in the mobile telephones, and if the security modules, or alternatively the applications 190 and 190', have functions for reducing and increasing the stored values, it is not necessary to set up a connection.

FIG. 3 shows an example of part of a message that can be sent by the mobile telephone of the debtor to that of the creditor during the transaction before it is encrypted (steps 225 and 230 in FIG. 2). As shown, the message 300 here includes a first field 305 corresponding to the amount of the transaction and a second field 310 corresponding to the reference of the account to be debited or to an identifier of the debtor enabling those references to be retrieved. The message 300 can equally include a third field corresponding to the identifier of the creditor, for example their initials. The second field 310 is naturally not necessary if the values are stored directly in the portable electronic entity of the debtor, i.e. if the message 400 is not necessarily sent to a server of a third party to effect the transaction. As indicated above, the message 300 is preferably encrypted before it is sent. Some data of the message is not shown in FIG. 3, such as the signature and the keys.

FIG. 4 shows one example of part of a message sent by the mobile telephone of the creditor to that of the debtor when the creditor has confirmed the transaction (step 265 in FIG. 2) or part of a message sent to a computer system of a banking establishment, a trusted third party or a person responsible for managing the values concerned, in transaction request form.

As shown, the message 400 includes the fields 305 and 310 described above, relating to the amount of the transaction and to the account to be debited or the identification of the debtor. The message 400 further includes a field 405 corresponding to the reference of the account to be credited or to indications relating to the creditor enabling that reference to be retrieved. As indicated above, the second field 310 and/or the third field 405 are not necessary if the values are stored directly in the mobile telephone of the debtor and/or the creditor, i.e. if the message 400 is not necessarily sent to a server of a third party to effect the transaction. Some data of the message is not shown in FIG. 4, such as the signature and the keys. The message 400 is preferably encrypted before it is sent.

It should be noted that although the creditor can read the message 300 and add information relating to the account to be credited, the creditor cannot modify the fields 305 and 310 concerning the amount of the transaction and the references of the account to be debited because of the security features used.

Figure 5:
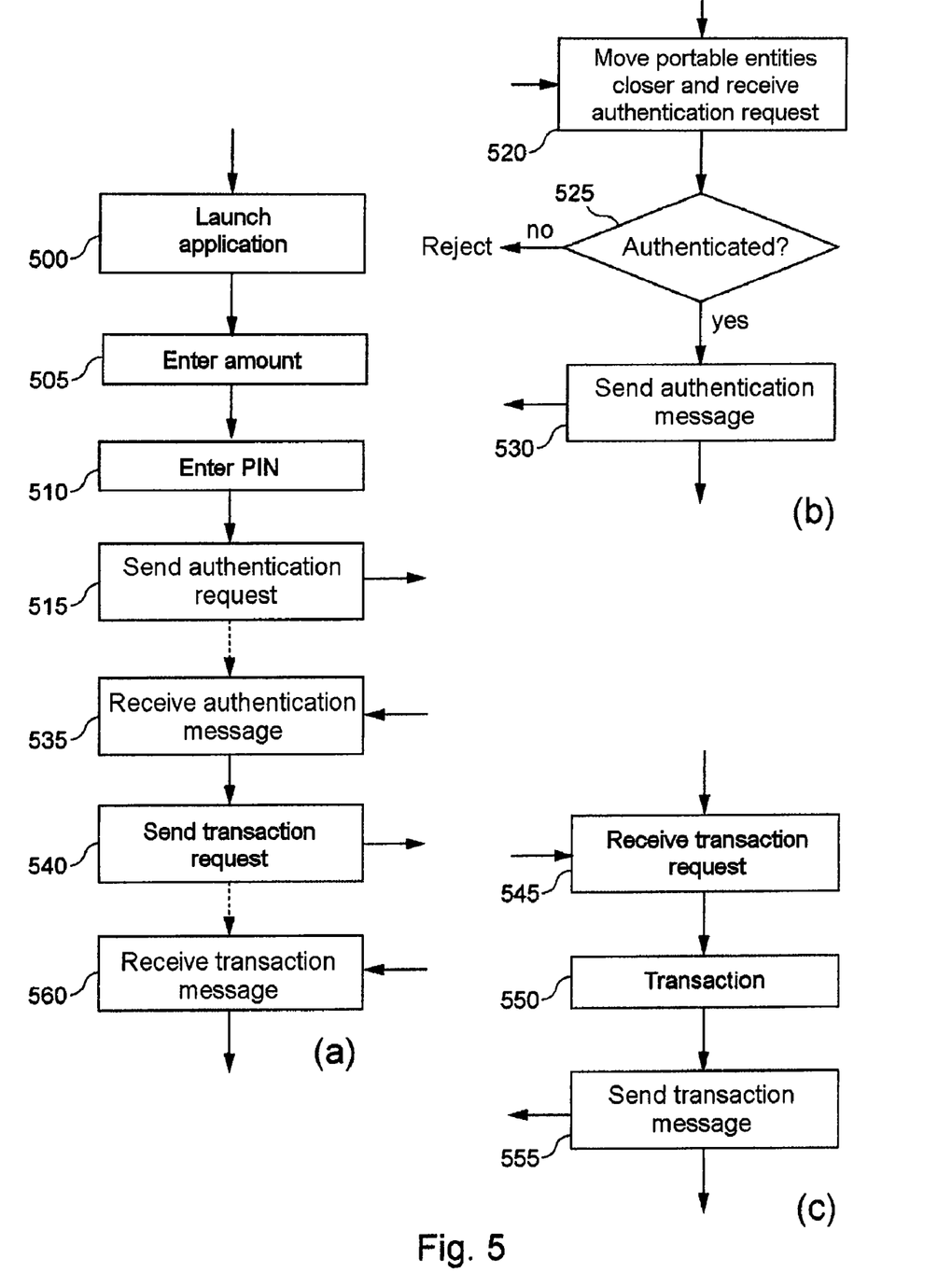

FIG. 5, comprising FIGS. 5a, 5b and 5c, shows a second embodiment of the invention for transferring a monetary or other amount between a debitor and a creditor, one having a mobile telephone and the other having a portable electronic entity that can be a mobile telephone. It is considered here that the creditor has a mobile telephone like that shown in FIG. 1 and the debitor has a microcircuit card including near-field wireless communication means and authentication means such as authentication cryptographic means.

FIG. 5a represents the algorithm used in the mobile telephone of the creditor, FIG. 5b represents the algorithm used in the microcircuit card of the debitor, and FIG. 5c represents the algorithm used by the banking establishment, the trusted third party or the person responsible for managing the values concerned.

After launching the application 190 for transferring values (step 500), the creditor enters a monetary or other amount (step 505), preferably using the input device 170. The amount can be shown on the screen 150.

The debitor is then prompted to enter his personal identification number on the mobile telephone of the creditor (step 510). The personal identification number is advantageously entered using the input device 170. It is preferably not displayed on the screen 150.

The application 190 then forms an authentication request containing the personal identification number which is sent to the near-field wireless communication module 160. In turn, the module 160 forwards the authentication request to the microcircuit card of the debitor.

The mobile telephone of the creditor and the microcircuit card of the debitor are moved closer to enable transmission of data between them using their near-field wireless communication means.

A secure communication channel is advantageously set up between the mobile telephone of the creditor and the microcircuit card of the debitor using temporary encryption keys. These temporary keys are stored in security modules in the near-field wireless communication modules, for example.

Alternatively, the authentication request can be encrypted before it is sent to the microcircuit card of the debitor.

After receiving the authentication request (step 520), the microcircuit card of the debitor authenticates the personal identification number contained in the request, for example by comparing it with a personal identification number stored beforehand in the microcircuit card of the debitor (step 525).

If the personal identification number is not valid, the authentication request is rejected. On the other hand, if the personal identification number is valid, the microcircuit card of the debitor, in response to the request, creates an authentication message that is sent (step 530) to the mobile telephone of the creditor, i.e. here to the module 160.

The authentication message preferably includes information for authenticating it. The authentication message advantageously includes first information enabling authentication of the message by the creditor and second information enabling authentication of the message by a third party, for example a computer system of a banking establishment. This authentication information can be a signature. The authentication message is preferably at least partly encrypted.

The authentication method advantageously includes, preferably in encrypted form, references of the debitor enabling a computer system of a banking establishment, a trusted third party or a person responsible for managing the values concerned to debit an account.

After reception of the authentication message (step 535), the module 160 sends the authentication message to the application 190. The application then forms a transaction request including the authentication message, the amount entered beforehand and references of the creditor such as their account number.

The transaction request preferably includes information for authenticating the debitor, the amount of the transaction and/or the creditor. The transaction request can include part of the authentication message received from the portable electronic entity of the debitor.

The transaction request is preferably at least partly encrypted by cryptographic means.

The transaction request is then sent (step 540) by the mobile telephone of the creditor to a computer system of the banking establishment, the trusted third party or the person responsible for managing the values concerned. Here the transaction request is sent via the mobile telephone network.

When the transaction request is received (step 545) by the computer system of the banking establishment, the trusted third party or the person responsible for managing the values concerned, the recipient authenticates the transaction request. If the transaction request is not authenticated, it is rejected. Similarly, if the transaction cannot be effected, for example if there is not sufficient credit on the account of the debitor, the transaction request is rejected. If the transaction request is not rejected, the monetary or other amount is transferred (step 550) in a standard way. A transaction confirmation or rejection message is then advantageously sent by the computer system of the banking establishment, the trusted third party or the person responsible for managing the values concerned (step 555) to the mobile telephone of the creditor when the transaction has been effected or rejected.

On reception of the confirmation or rejection (step 560), an indication is displayed on the screen 150 to show that the transaction has been effected or rejected. This confirmation can be forwarded to the microcircuit card of the debitor where it can be stored.

The confirmation message can take the form of an SMS (Short Message Service) message, the telephone number of the creditor being sent with the transaction request or stored by a computer system of the banking establishment, the trusted third party or the person responsible for managing the values concerned in relation with the references of the account to be credited.

Alternatively, the transaction request and the transaction message can be sent via a data communication network, for example the Internet, to which the mobile telephone of the creditor and a computer system of the banking establishment, the trusted third party or the person responsible for managing the values concerned are connected. The mobile telephone of the creditor can be connected to that network in accordance with one of the WiFi standards, for example.

Although the agreement of the debitor can be confirmed by entering a personal identification number and comparing the number entered with a number stored beforehand, that agreement can be confirmed using other techniques. In particular, the agreement of the debitor can be confirmed by biometric means such as fingerprint comparison. In this case, the portable electronic entity of the debitor must have means for entering this information, for example a fingerprint reader.

In another embodiment, a transaction message is first sent by the creditor to the debitor. The mobile telephone of the creditor and the portable electronic entity of the debitor, each having near-field wireless communication means, here each have a memory, preferably a secure memory, for storing a monetary or other balance from or to which the monetary or other amount of the transaction can be debited or credited. Alternatively, only the mobile telephone of the creditor of the portable electronic entity of the debitor has such a balance, the transaction then being partially executed by a computer system of a third party.

The mobile telephone of the creditor sends the portable electronic entity of the debitor, via the near-field wireless communication means, a secure transaction message including the monetary or other amount of the transaction. The message is secured by a cryptographic key that can be used by a large number of holders of portable electronic entities.

If the mobile telephone of the debitor is not near the portable electronic entity of the debitor, the mobile telephone of the debitor and the portable electronic entity of the debitor must be moved closer to each other.

The portable electronic entity of the debitor advantageously has an activation button for activating reception of transaction messages via the near-field wireless communication means. Debitors therefore control the reception of transaction messages to prevent debits unknown to them. In one particular embodiment, this activation button activates the near-field wireless communication means.

The transaction message is authenticated by the portable electronic entity of the debitor to verify that the creditor is authorized to send them this kind of transaction message.

Once it has authenticated the transaction message, the portable electronic entity of the debitor debits the monetary or other balance stored by the monetary or other value of the transaction. The portable electronic entity of the debitor then sends a secure message to the mobile telephone of the creditor via the near-field wireless communication means. The secure message preferably includes the monetary or other amount of the transaction.

Once again, if the mobile telephone of the creditor is not near the portable electronic entity of the debitor, the mobile telephone of the creditor and the portable electronic entity of the debitor must be moved closer to each other.

On reception of the secure message, the mobile telephone of the creditor authenticates it. If the message is authenticated, the stored monetary or other balance is credited.

If the mobile telephone of the creditor or the portable electronic entity of the debitor has no memory for storing a monetary or other balance, it sends a corresponding transaction request to a computer system of a third party to effect that operation.

If an exchange of data between the portable electronic entities is used to proceed to the transaction, for example according to the last embodiment described the portable electronic entity of the creditor and/or that of the debitor advantageously include(s) means for indicating to the user that a transaction is in progress and/or has finished.

In the last embodiment described, if the call is cut off after the transaction message is sent and before the secure message is received, the portable electronic entity of the debitor may be debited although the mobile telephone of the creditor is not credited.

For example, the mobile telephone of the creditor produces a first audible signal when a transaction message is sent and a second audible signal, preferably different from the first, when a secure message is received. Alternatively, or in addition to this, a visual transaction indication can be displayed on the screen of the portable electronic entity to show that the transaction is in progress or has finished.

In one particular embodiment, the mobile telephone of the creditor uses an internal status indicator. In this embodiment, the mobile telephone of the creditor activates an internal status indicator when the transaction message is sent. That internal status indicator is deactivated on reception of the secure message corresponding to the transaction message.

A number of internal status indicators can be used if the creditor carries out a number of transactions in a short time period.

If, after a predetermined time, the internal status indicator is still active, the transaction must be cancelled in the portable electronic entity of the debitor or the secure message must be sent again. To this end, the mobile telephone of the creditor can send a transaction cancellation message or a message to send the secure message again.

Naturally, to satisfy specific requirements, a person competent in the field of the invention can make modifications to the above description.

The invention claimed is:

1. A personal portable electronic device enabling a creditor to transfer a monetary or other amount, the personal portable device comprising:
   a near-field wireless communication module;
   a central processing unit; and
   a memory module, the memory module storing a program executed by the central processing unit to perform the steps of:
   receiving via said near-field wireless communication module from a personal portable electronic entity of a debitor a secure message including information for authenticating said debitor and said monetary or other amount;
   creating a transaction request including data linked to said monetary or other amount;
   transmitting from the near-field wireless communication module of the creditor a confirmation indication to the near-field wireless communication module of the debitor in response to the receiving the secure message and the creating the transaction request; and
   sending from the near-field wireless communication module of the creditor said transaction request to a third party computer system via a communication network, the sending of said transaction request being deferred in the absence of connection to said third party computer system,
   wherein the transmitting the confirmation indication is carried out one of prior to the sending said transaction request; simultaneous to the sending said transaction request; and after the sending of said transaction request,
   wherein the transaction is effected after the transmitting the confirmation indication.

2. The device according to claim 1, wherein said received secure message further includes said data linked to said monetary or other amount.

3. The device according to claim 1, further including input device to input information for authenticating said debitor, said near-field wireless communication module sending said information for authenticating said debitor.

4. The device according to claim 1, wherein the program further comprises the step of:
   adding to said transaction request authentication information enabling a recipient of said transaction request to authenticate at least part of said transaction request, said data or said debitor.

5. The device according to claim 1, wherein the program further comprises the step of:

receiving a transaction confirmation message, said near-field wireless communication module sending said transaction confirmation message.

6. The device according to claim 5, wherein the program further comprises the step of:
storing a received transaction confirmation message.

7. The device according to claim 1, wherein said near-field wireless communication module conforms to a Near Field Communication standard.

8. The device according to claim 1, wherein said transaction request to a third party is performed by a personal portable electronic entity of the creditor.

9. The device according to claim 1, wherein the program executed by the central processing unit of the personal portable electronic device of the creditor causes the central processing unit to automatically perform the steps of i) creating the transaction request, ii) transmitting the confirmation indication, and iii) sending the transaction request upon reception of the secure message and the received secured message having been identified as a transaction message.

10. A mobile telephone including a personal portable electronic device enabling a creditor to transfer a monetary or other amount, the personal portable electronic device comprising:
a near-field wireless communication module;
a central processing unit; and
a memory module, the memory module storing a program executed by the central processing unit to perform the steps of:
receiving via said near-field wireless communication module from a personal portable electronic entity of a debtor a secure message including information for authenticating said debtor and said monetary or other amount;
creating a transaction request including data linked to said monetary or other amount;
transmitting from the near-field wireless communication module of the creditor a confirmation indication to the near-field wireless communication module of the debtor in response to the receiving the secure message and the creating the transaction request; and
sending from the near-field wireless communication module of the creditor said transaction request to a third party computer system via a communication network, the sending of said transaction request being deferred in the absence of connection to said third party computer system,
wherein the transmitting the confirmation indication is carried out one of prior to the sending said transaction request; simultaneous to the sending said transaction request; and after the sending of said transaction request,
wherein the transaction is effected after the transmitting the confirmation indication.

11. A method for sending a monetary or other value between a debtor and a creditor each having a personal portable electronic device including near-field wireless communication module, the method comprising:
receiving via the personal portable electronic device of the creditor information for authenticating said debtor via said near-field wireless communication module from the personal portable electronic device of the debtor;
receiving via the personal portable electronic device of the creditor data linked to said monetary or other amount via said near-field wireless communication module from the personal portable electronic device of the debtor;
creating via the personal portable electronic device of the creditor a transaction request including said data;
transmitting from the near-field wireless communication module of the creditor a confirmation indication to the near-field wireless communication module of the debtor in response to the receiving the secure message and the creating the transaction request; and
sending from the personal portable electronic device of the creditor said transaction request to a third party computer system via a communication network, the sending of said transaction request being deferred in the absence of connection to said third party computer system,
wherein the transmitting the confirmation indication is carried out one of prior to the sending said transaction request; simultaneous to the sending said transaction request; and after the sending of said transaction request,
wherein the transaction is effected after the transmitting the confirmation indication.

12. The method according to claim 11, further comprises the step of:
moving said personal portable electronic entities closer to each other.

13. The method according to claim 11, further comprises a step of:
receiving a transaction confirmation message and a step of forwarding said transaction confirmation message via said near-field wireless communication module.

14. The method according to claim 11, wherein said monetary or other amount is a monetary value, a number of loyalty points, a purchase or subscription voucher, a number of gaming points, a number of telephone units or rights to reproduce digital recordings.

15. The method according to claim 11, wherein said personal portable electronic entity of said creditor is a mobile telephone.

16. The method according to claim 11, wherein said personal portable electronic entity of said debtor is a mobile telephone or a microcircuit card.

17. The method according to claim 11, wherein said steps of i) creating the transaction request, ii) transmitting the confirmation indication, and iii) sending the transaction request are automatically performed upon reception of the secure message and the received secured message having been identified as a transaction message in response to a step of identifying the received secured message as a transaction message.

18. A non-transitory computer readable recording medium with a computer program recorded thereon including instructions executed by a central processing unit to perform a method of sending a monetary or other value between a debitor and a creditor each having a personal portable electronic device including near-field wireless communication module, the method comprising:
receiving at the personal portable electronic device of the creditor information for authenticating said debtor via said near-field wireless communication module from the personal portable electronic device of the debtor;
receiving at the personal portable electronic device of the creditor data linked to said monetary or other amount via said near-field wireless communication module from the personal portable electronic device of the debtor;
creating a transaction request including said data;
transmitting from the near-field wireless communication module of the creditor a confirmation indication to the near-field wireless communication module of the debtor in response to the receiving the secure message and the creating the transaction request; and
sending said transaction request to a third party computer system via a communication network, the sending of said transaction request being deferred in the absence of connection to said third party computer system, wherein the transmitting the confirmation indication is carried out one of prior to the sending said transaction request; simultaneous to the sending said transaction request; and after the sending of said transaction request, wherein the transaction is effected after the transmitting the confirmation indication.

19. The non-transitory computer readable recording medium according to claim 18, wherein said steps of i) creating the transaction request, ii) transmitting the confirmation indication, and iii) sending the transaction request are automatically performed upon reception of the secure message and the received secured message having been identified as a transaction message in response to a step of identifying the received secured message as a transaction message.

20. A personal portable electronic device enabling a creditor to receive a monetary or other amount, the personal portable device comprising:

a near-field wireless communication module;

a central processing unit; and a memory module, the memory module storing a program executed by the central processing unit to perform the steps of:

transmitting via said near-field wireless communication module from a personal portable electronic entity of a creditor a secure message including information for authenticating said debitor and said monetary or other amount;

upon authentication by a personal portable electronic entity of the debitor, creating a transaction request including data linked to said monetary or other amount;

transmitting from the personal portable electronic entity of a creditor a confirmation indication to the personal portable electronic entity of the debitor in response to the transmitting the secure message and the creating the transaction request; and sending said transaction request from a personal portable electronic entity of the creditor to a third party computer system via a communication network, the sending of said transaction request being deferred in the absence of connection to said third party computer system, wherein the transmitting the confirmation indication is carried out one of prior to the sending said transaction request; simultaneous to the sending said transaction request; and after the sending of said transaction request, wherein the transaction is effected after the transmitting the confirmation indication.

\* \* \* \* \*